United States Patent
Droulez et al.

(10) Patent No.: US 10,437,561 B2
(45) Date of Patent: Oct. 8, 2019

(54) STOCHASTIC PARALLEL MICROPROCESSOR

(71) Applicants: Centre national de la recherche scientifique, Paris (FR); COLLEGE DE FRANCE, Paris (FR)

(72) Inventors: Jacques Droulez, Paris (FR); Pierre Bessiere, Paris (FR)

(73) Assignees: CENTRE NATIONAL DE LA RECHERCHE SCIENTIFIQUE, Paris (FR); COLLEGE DE FRANCE, Paris (FR)

( * ) Notice: Subject to any disclaimer, the term of this patent is extended or adjusted under 35 U.S.C. 154(b) by 0 days.

(21) Appl. No.: 15/740,983

(22) PCT Filed: Jun. 17, 2016

(86) PCT No.: PCT/EP2016/064023
§ 371 (c)(1),
(2) Date: Dec. 29, 2017

(87) PCT Pub. No.: WO2017/001212
PCT Pub. Date: Jan. 5, 2017

(65) Prior Publication Data
US 2018/0196642 A1 Jul. 12, 2018

(30) Foreign Application Priority Data
Jun. 29, 2015 (FR) ...................... 15 56102

(51) Int. Cl.
*G06F 7/70* (2006.01)
*G06F 7/58* (2006.01)
(52) U.S. Cl.
CPC ................ *G06F 7/70* (2013.01); *G06F 7/584* (2013.01); *G06F 2207/582* (2013.01)

(58) Field of Classification Search
CPC ........................................................ G06F 7/70
See application file for complete search history.

(56) References Cited

U.S. PATENT DOCUMENTS

| 6,745,219 B1 * | 6/2004 | Zelkin .................... G06N 7/005 708/490 |
| 2011/0255612 A1 * | 10/2011 | Bernstein ........... H03M 13/1111 375/259 |

FOREIGN PATENT DOCUMENTS

GB    1184652 A    3/1970

OTHER PUBLICATIONS

International Search Report dated Sep. 4, 2016 for International Application No. PCT/EP2016/064023, 7 pages.
(Continued)

*Primary Examiner* — Andrew Caldwell
*Assistant Examiner* — Emily E Larocque
(74) *Attorney, Agent, or Firm* — Knobbe, Martens, Olson & Bear, LLP

(57) ABSTRACT

The invention relates to a stochastic-type microprocessor.
In some embodiments, the microprocessor comprises an elementary stochastic computation module able to receive, as input, two random and independent binary input signals each representing a binary coding of two respective given input probability values, and able to generate, as output, a random binary output signal.
The elementary module comprises:
  a programmable logic unit, able to combine two input signals to generate an output signal;
  an addressable memory, able to store an output probability value coded by an output signal generated by the logic unit;
  a first stochastic clock, able to produce a first clock signal;
(Continued)

Figure 1:
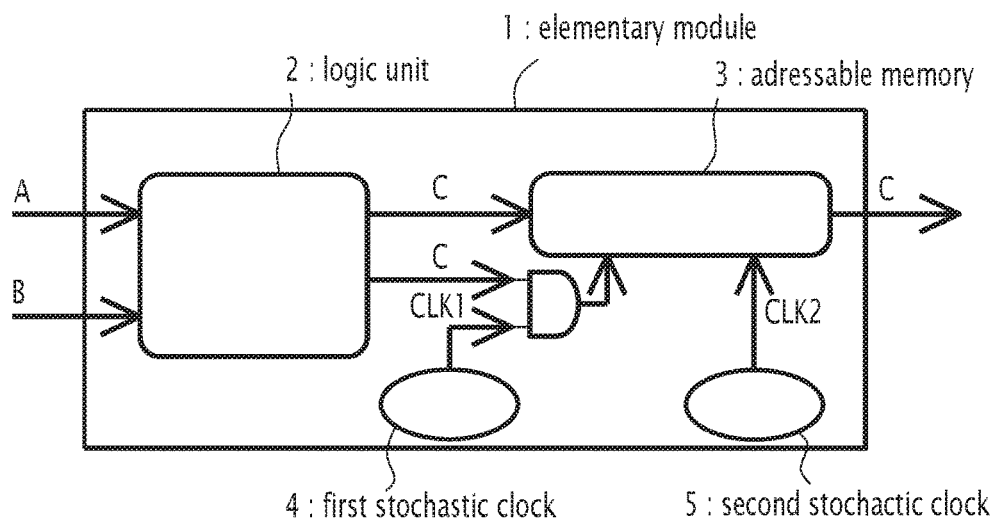

a second stochastic clock, able to produce a second clock signal.

9 Claims, 2 Drawing Sheets

(56) References Cited

OTHER PUBLICATIONS

Written Opinion of the International Searching Authority dated Sep. 4, 2016 for International Application No. PCT/EP2016/064023, 5 pages.
Gaines B: "Stochastic computer thrives on noise", Electronics, VNU Business Publications, New York, US, vol. 40, No. 14, Jul. 10, 1967, pp. 72-79, XP002092489.
Poppelbaum W J et al: "Stochastic computing elements and systems", Fall Joint Computer Conference, Nov. 1, 1967, pp. 635-644, XP058027876.
Armin Alaghi et al: "Survey of Stochastic Computing", ACM Transactions on Embeded Computing Systems, ACM, New York, NY, US, vol. 12, No. 2s, May 1, 2013, pp. 1-19, XP058018698.

* cited by examiner

STOCHASTIC PARALLEL MICROPROCESSOR

CROSS REFERENCE TO RELATED APPLICATIONS

This application is the U.S. National Phase Application under 35 U.S.C. § 371 of International Application No. PCT/EP2016/064023 filed on Jun. 17, 2016, designating the U.S. and published as WO 2017/001212 A1 on Jan. 5, 2017, which claims the benefit of French Patent Application No. 1556102, filed Jun. 29, 2015, which are hereby incorporated by reference in their entirety.

The present invention relates to a stochastic-type microprocessor, in particular making it possible to perform parallel computations. It is particularly applicable to fields in which probability computations and uncertainty management are heavily used, such as financial markets, macroeconomic modeling, weather forecasting, long-term evolution modeling. It is also applicable to fields in which learning methods are used, for example in the case of genetic algorithms, particularly for robotics and artificial intelligence. It is also applicable to the cryptography field. In general, the invention is applicable to any field in which intensive probabilistic or stochastic computations are required.

At this time, the traditional microprocessors used in the known computer systems have reached an upper physical limit in terms of computing speed.

Indeed, the speed of light imposes an upper bound on clock timings. Since the 2000's, the timing of traditional microprocessor clocks has been stagnating at around 3 or 4 GHz.

Furthermore, these traditional microprocessors have also reached a lower physical limit in terms of miniaturization.

Indeed, the etching dimensions of integrated circuits do not drop below the 10 nm bar, below which the behavior of the logic circuits becomes unstable and not deterministic. Consequently, logic circuits cannot be further miniaturized without undermining their reliability.

To exceed these limits and meet the ever-growing needs for computing power, a large number of processors can be operated in parallel. However, systems based on this operation are expensive, cumbersome, demand an appropriate infrastructure and consume a large quantity of energy.

Furthermore, more specifically with respect to energy consumption, the notion of thermal noise plays an important role. Indeed, below the thermal noise "bar", it is no longer possible to obtain a deterministic behavior from the transistors making up the majority of the components of a traditional microprocessor.

Furthermore, at this time, a growing number of applications are making massive use of probability computations and uncertainty management. These applications are very costly in terms of computing power, when they are implemented on traditional computer systems, since the latter are designed to work completely deterministically.

Yet irrespective of the field of application, the simulation by large-scale probabilistic models is currently being done by deterministic machines comprising a very large number of interconnected processors, according to cluster- or supercomputer-type architectures, in very costly facilities in terms of infrastructure and energy consumption, with substantial needs in particular regarding air-conditioning and cooling for "multi-cores".

One of the aims of the invention is therefore to resolve the aforementioned problems. The invention thus in particular aims to propose a microprocessor making it possible to resolve the technological locks described above, by abandoning the constraint of fully deterministic operation.

The invention therefore relates, according to a first aspect, to a microprocessor comprising at least one elementary stochastic computation module able to receive, as input, two random and independent binary input signals each representing a binary coding of two respective given input probability values, and able to generate, as output, a random binary output signal from two input signals.

The elementary module comprises at least one programmable logic unit, able to combine two input signals to generate an output signal according to at least one determined logic function, such that the output signal represents a binary coding of an output probability value as a function of the given input probability values.

The elementary module also comprises at least one addressable memory, able to store an output probability value coded by an output signal generated by the logic unit.

The elementary module further comprises at least one first stochastic clock, able to produce a first random impulse clock signal to control the writing speed, in the memory, of an output probability value coded by the output signal generated by the logic unit.

The elementary module also comprises at least one second stochastic clock, able to produce a second random impulse clock signal to control the reading speed of the memory, so as to provide the current evaluation, over a given time window, of an output probability value stored in the memory.

According to certain embodiments, the microprocessor further comprises one or more of the following features, considered alone or according to all technically possible combinations:

- the elementary module is able on the one hand to receive, as input, random and independent binary input signals each representing a stochastic impulse binary coding or a telegraphic temporal binary coding, respectively, of the two given input probability values, and on the other hand to generate, as output, a random binary output signal, of the telegraphic or impulse type, and the logic unit is able to combine the two input signals to generate the output signal according to the determined logic function, such that the output signal represents a stochastic impulse binary coding or a telegraphic temporal binary coding of the output probability value as a function of the given input probability values;
- the logic unit is able to combine the two input signals to generate the output signal according to one or several of the product, sum and division functions, such that the output probability value coded by the output signal respectively corresponds to the product, the sum and the division, of the input probability values respectively coded by the two input signals;
- the microprocessor comprises several elementary modules as described above, and it is able to generate, in parallel, at least two output signals via at least two elementary modules determined from among said elementary modules, so as to allow the implementation, in parallel, of at least two corresponding stochastic computations;
- the at least two determined elementary modules are interconnected so as to allow signals to be exchanged between them;
- the memory of at least one of the two interconnected elementary modules is able to store interconnection instructions relative to the interconnection and exchange of input and output signals between the two interconnected elementary modules;

the microprocessor comprises at least two remote elementary modules, and one or several addressable switch boxes so as to allow input and output signals to be exchanged between the two remote elementary modules;

the microprocessor comprises one or several random signal generators each able to generate a random binary signal generating a binary coding of a probability value associated with a binary number, and the elementary module(s) are able to receive, as input, two random and independent binary input signals generated by the random signal generator(s).

The invention also relates, according to a second aspect, to a computer system comprising at least one central memory able to store instructions and at least one central processing unit able to execute instructions stored in the central memory, the central processing unit comprising at least one microprocessor as described above.

Thus, the microprocessor according to the invention combines, on a same substrate, traditional components with a deterministic behavior, such as logic gates, addressable memories and switches, and nanocomponents having a random behavior, which makes it possible to considerably increase the performance levels in terms of probabilistic computations while reducing the manufacturing, maintenance, operating and energy consumption costs.

In the case of an architecture with several elementary modules operating in parallel, the stochastic microprocessor of the invention gathers, within a same integrated circuit, a large number of clocks and components generating random events, as well as a large number of memories and logic circuits.

The stochastic nature of the events eliminates the synchronization lock and makes it possible to carry out a large number of operations in parallel.

Indeed, the high degree of parallelism allowed by the use of random clocks greatly increases performance levels.

Thus, relative to a microprocessor with a conventional architecture, the microprocessor according to the invention makes it possible to display probabilistic and stochastic calculations much more quickly.

More generally, abandoning the fully deterministic and predictable operating constraints of the traditional microprocessors allows the microprocessor according to the invention to be used to generate and simulate stochastic processes on a very large scale, thereby making it possible to greatly extend the field of application of Monte Carlo-type simulations of complex phenomena and to resolve or approach probabilistic inference problems pertaining to a large number of random variables, such as those set out by financial markets, macroeconomic models, weather forecasts, or long-term evolution models.

The microprocessor according to the invention further makes it possible to generate, in a non-algorithmic, or partially algorithmic, manner, random numbers drawn from any distribution.

The features and advantages of the invention will appear upon reading the following description, provided solely as a non-limiting example, in reference to the following appended drawings:

FIG. 1: schematic illustration of the architecture of an elementary stochastic computation module in an example microprocessor according to the invention;

FIGS. 2 to 6: schematic illustrations of examples of elementary logic components forming all or part of a programmable logic unit of an elementary stochastic computation module in a microprocessor according to the invention.

A microprocessor according to the invention comprises at least one elementary stochastic computation module 1 as illustrated in one example in FIG. 1.

This elementary module can receive, as input, two input signals A, B, or more.

These input signals A, B are random and independent binary signals each representing a binary coding, respectively, of two given input probability values.

Two types of elementary coding for the probability values can be used: a stochastic impulse coding and a telegraphic temporal coding.

With stochastic impulse coding, the signals have series of ultrashort pulses, such that the likelihood of observing a pulse at any moment depends on the coded probability value.

Thus, with this type of coding, the number of pulses observed during a determined time interval provides an estimate of the value of the coded probability. The larger the determined time interval is, in light of the mean frequency of the pulses, the greater the precision of the coding of the probability value is.

With telegraphic temporal coding, the signals randomly alternative between the two 0 and 1 states such that the cimulative time during which the signal is state 1 relative to the total duration of the determined observation time interval is equal to the coded probability value.

These two types of coding of the probability values are complementary. They are both based on binary electrical signals, which are therefore compatible with traditional logic circuits.

There are no theoretical constraints on the statistical distribution of the time intervals between two successive pulses in an impulse signal, or between two state transitions in a telegraphic signal.

In particular, a distribution according to a Poisson statistic is completely suitable. In this case, a clock generating stochastic pulses will be defined by a single parameter: the mean frequency. The duration of the pulses may be as short as possible, but must remain sufficient to allow the state transition of the switches.

The physical processes responsible for the random behavior of the components must be independent relative to one another. In particular, they must not create a temporal correlation between two separate signals.

The microprocessor according to the invention may comprise one or several random signal generators, not shown in FIG. 1, each making it possible to generate a random binary signal generating a binary coding, for example according to one of the types described above, with a probability value associated with a binary number. The elementary module 1 then receives, as input, the input signals A, B generated by the random signal generator(s).

The elementary module 1 is able to generate, as output, at least one random binary output signal C, from two input signals A, B.

This elementary module 1 also comprises at least one programmable logic unit 2.

This logic unit 2 comprises a certain number of traditional logic components, organized according to a determined logic architecture, so as to make it possible to generate the output signal C according to at least one logic function determined from the combination of the input signals A, B.

Thus, the output signal C represents a binary coding of an output probability value that is a function of the input probability values respectively coded by the input signals A, B.

Depending on the function performed by the logic unit 2, and depending on the nature of the input signal A and the nature of the input signal B, the output signal C represents a stochastic impulse binary coding or a telegraphic temporal binary coding of the output probability value as a function of the input probability values.

FIGS. 2 to 6 show examples of elementary logic components able to form all or part of the logic unit 2 of the elementary module 1.

In general, the microprocessor according to the invention must make it possible to perform any type of probabilistic computation using random signals A, B. Yet in probability theory, all computations are based on the combination of three rules, which are simple to state, but which prove costly to implement with a conventional microprocessor.

The first rule is the product rule, or Bayes rule, according to which the joint probability of two variables A, B is equal to the product of the probability of a first of the two variables A, B multiplied by the probability of the other, conditioned by the first:

$$P(A\&B)=P(A){\cdot}P(B|A)=P(B){\cdot}P(A|B)$$

The second rule is the sum rule, or marginalization rule, according to which the probability distribution over a first variable A is equal to the sum of the joint probabilities of the first variable A and a second variable B for all possible values of the second variable B. Thus, if the second variable B can assume n values from 1 to n, the sum rule gives:

$$P(A)=P(A\&B=1)+P(A\&B=2)+\ldots+P(A\&B=n-1)+P(A\&B=n)$$

The third rule is the normalization rule. It results from the constraints imposed in probability theory according to which the sum of the probabilities of all of the possible values of a variable must be equal to 1. Yet it is often easier to perform calculations to within a multiplicative factor. This normalization rule therefore imposes dividing the results of proportional intermediate computations by a normalization factor, such that the final sum of the probabilities for all possible values of the variable in question is equal to 1.

Thus, the microprocessor according to the invention must make it possible to perform the equivalent of the product, sum and division operations on the random physical signals representing the probability values.

These three operations can be carried out by logic circuits, implemented in the logic unit 2, using, as input, two stochastic, or random, signals of the telegraphic or impulse type, as previously seen.

Figure 2:
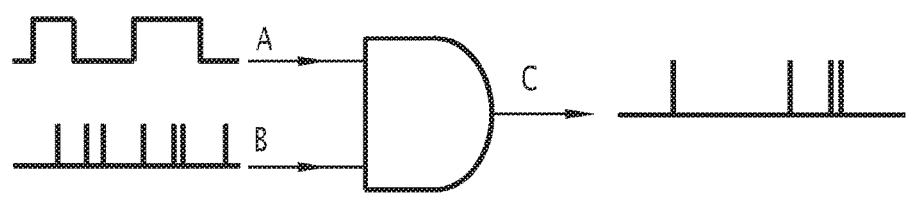
Figure 3:
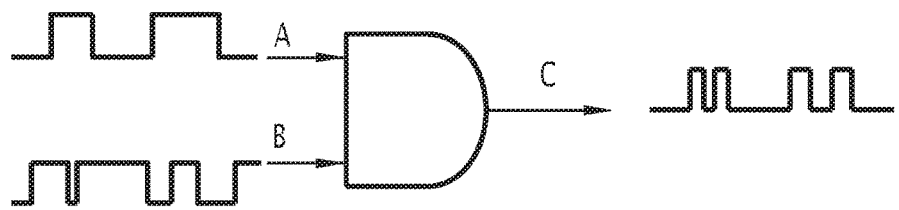

As an example, illustrated in FIGS. 2 and 3, the product can be done by an "AND" logic gate using, as input, two independent random signals, both of the telegraphic type (FIG. 3), or one of the telegraphic type and the other of the impulse type (FIG. 2).

Thus, in the example of FIG. 2, an "AND" logic gate receives, as input, a telegraphic signal A whose probability of being 1 is denoted P(A=1), and an impulse signal B whose mean frequency is denoted $F_B$. The two input signals A and B are random and independent.

The output signal C is then a random impulse signal whose mean frequency $F_C$ is the product of the mean frequency of the input impulse signal B and the probability of being 1 of the input telegraphic signal A:

$$F_C=F_B{\cdot}P(A=1)$$

In other words, the mean frequency $F_C$ of the output signal C is equal to the product of the mean frequency $F_B$ of the input signal B multiplied by the time spent by the input signal A in the state 1 relative to the total observation time.

Furthermore, as illustrated by the example in FIG. 2, an "AND" logic gate constitutes an elementary logic component making it possible to convert an input signal A or B of the telegraphic type into an output signal C of the impulse type.

In the example of FIG. 3, an "AND" logic gate receives, as input, two telegraphic signals A and B, whose respective probabilities of being 1 are denoted P(A=1) and P(B=1). The two input signals A and B are random and independent.

The output signal C is then a random telegraphic signal whose probability of being 1 is the product of the probability of being 1 of the input telegraphic signal A and the probability of being 1 of the input telegraphic signal B:

$$P(C=1)=P(A=1){\cdot}P(B=1)$$

In other words, the output signal C is such that the time spent in the state 1 relative to the total observation time is equal to the product of the time spent by the input signal A in the state 1 relative to the time spent by the input signal B each relative to the total observation time.

It will be recalled that the above is true as long as the temporal independence condition of the underlying physical processes of the generation of the random signals A, B, mentioned above, is respected.

Figure 4:
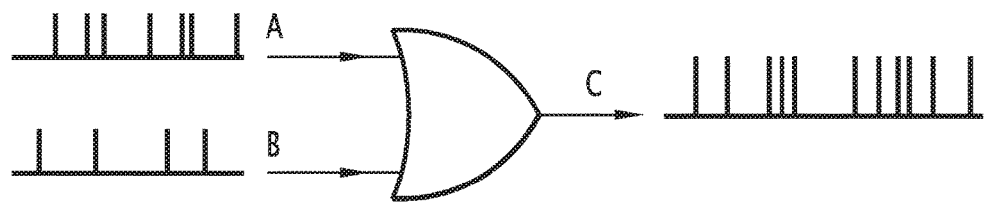

As an example, illustrated in FIG. 4, the sum can be done by an "OR" logic gate using, as input, two independent random signals A and B, i.e., temporally decorrelated, both of the impulse type.

Thus, in this example of FIG. 4, an "OR" logic gate receives, as input, these two impulse signals A and B, whose respective mean frequencies are denoted $F_A$ and $F_B$. The two input signals A and B are random and independent.

The output signal C is then a random impulse signal whose mean frequency $F_C$ is the sum of the respective mean frequencies of the input impulse signal A and B:

$$F_C=F_A+F_B$$

Figure 5:
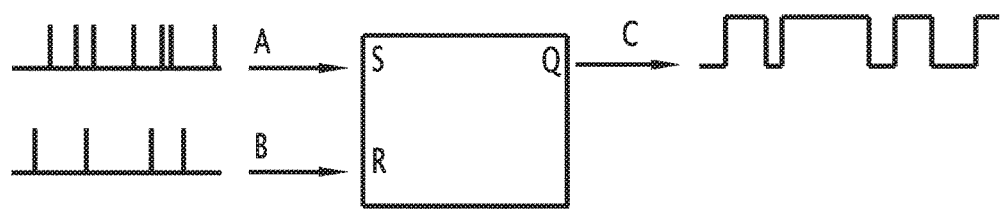

As an example, illustrated in FIG. 5, the division operation can be done by a switch logic gate (1 bit memory) using, as input, two temporally decorrelated random signals A and B, both of the impulse type, one on the input S ("set") and the other on the input R ("reset").

In this example of FIG. 5, the switch receives, as input, the two impulse signals A and B, whose respective mean frequencies are denoted $F_A$ and $F_B$. The two input signals A and B are random and independent.

The output signal C is then a random telegraphic signal whose score, i.e., the probability that the output signal C is 1, relative to the probability that this output signal C is 0, is equal to the mean frequency of the input signal A relative to the mean frequency of the input signal B:

$$P(C=1)/P(C=0)=F_A/F_B$$

In other words, an output signal C of the telegraphic type is obtained such that, on average, the time spent in state 1 relative to the time spent in state 0 is equal to the quotient of the mean frequencies $F_A$ and $F_B$ of the input impulse signals A and B.

Furthermore, as illustrated by the example in FIG. 5, a switch, or 1 bit memory, constitutes an elementary logic component making it possible to convert an input signal A or B of the impulse type into an output signal C of the telegraphic type.

Figure 6:
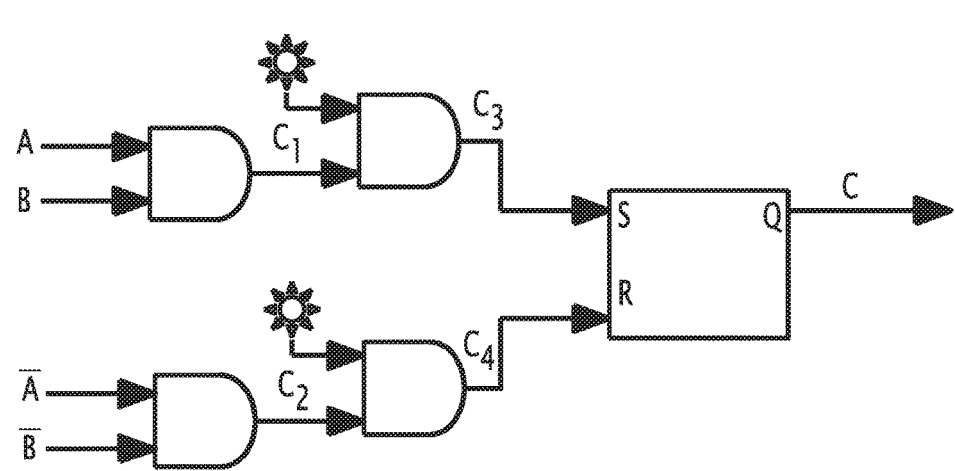

In the example of FIG. 6, two random and independent input telegraphic signals A and B are all first combined by passing a first "AND" logic gate, like in the example of FIG. 3.

In parallel, two input telegraphic signals $\overline{A}$ and $\overline{B}$, respectively complementary to the input signals A and B, also random and independent, are combined by passing a second "AND" logic gate, also like in the example of FIG. 3.

The output random telegraphic signals of the first and second "AND" logic gates are each recombined with a random impulse signal in two other "AND" logic gates. As output of these two other "AND" logic gates, two random impulse signals are obtained, which are combined by passing a switch (or 1 bit memory), like in the example of FIG. 5.

The output signal C of this switch is then a random telegraphic signal whose score, i.e., the probability that the output signal C is 1 relative to the probability that this output signal C is 0, is equal to the product of the quotes of the input telegraphic signals A and B:

$$P(C=1)/P(C=0)=[P(A=1)/P(A=0)]\cdot[P(B=1)/P(B=0)]$$

Referring again to FIG. 1, the elementary module 1 also comprises at least one addressable memory 3, which makes it possible to store the output probability values coded by the output signals C generated by the logic unit 2.

A first stochastic clock 4 is used to control the writing in the memory 2. To that end, the first clock 4 produces a first random impulse clock signal CLK1 that is received as input by the memory 3 in parallel with the output signal C of the logic unit 2. The impulses of the signal CLK1 therefore make it possible to control the writing of the output probability value coded by the output signal C.

A second stochastic clock 5 is used to control the reading in the memory 3. To that end, the second clock 5 produces a second random impulse clock signal CLK2 that is received by the memory 3. The impulses of the signal CLK2 therefore make it possible to provide the current evaluation, over a given time window, of an output probability value stored in the memory 3.

To perform complex probabilistic computations, a large quantity of sum, product and division operators is necessary. In this case, the microprocessor according to the invention comprises several elementary modules 1 as described above, which are interconnected. Each elementary module 1 thus constitutes an elementary stochastic computation unit.

In this case, reference is made to a stochastic parallel microprocessor. The latter is able to generate, in parallel, several output signals C via several elementary modules 1 determined by the set of elementary modules 1 that it comprises, so as to allow the implementation, in parallel, of several stochastic computations each corresponding to one of the determined elementary modules 1.

The microprocessor according to the invention with several interconnected elementary modules 1 therefore comprises one or several stochastic components, one or several switches, several addressable memories 3, and various logic circuits implemented in the various programmable logic units 2.

The logic circuits implemented in the logic units 2 define the functions that can be performed by the corresponding elementary modules 1.

The interconnection between elementary modules 1 is done such that two elementary modules 1 that are physically adjacent on the substrate can exchange input and output signals A, B, C.

Specifically, the memory 3 of an elementary module 1 interconnected with another elementary module 1 contains interconnection instructions that relate to the manner in which the two elementary modules 1 will exchange input and output signals A, B, C and convey these signals from one elementary module to the other.

Furthermore, the memory 3 of any elementary module 1 contains the specification of the function(s) to be applied to the input signals A, B by the logic unit 2 in order to obtain the output signal C.

Furthermore, the microprocessor also comprises, outside the stochastic elementary module(s) 1, one or several address decoding circuits, and a deterministic clock for synchronizing read and write cycles of the memories 3.

For the exchange between remote elementary modules 1, it is possible to provide addressable switch boxes, to allow the exchange of input and output signals A, B, C between these remote elementary modules 1.

The interconnections between adjacent or remote elementary modules 1 make it possible to convey two types of signals: random telegraphic signals, like those produced as output of a switch, and random impulse signals, like those generated by the stochastic clocks.

To initialize and modify the content of the addressable memories 3, various specific input/output modules can be used. Thus, for programming, it is possible to interface the microprocessor according to the invention with a conventional computer. In this case, the microprocessor is considered a specialized peripheral in the intensive probabilistic computation.

A stochastic parallel microprocessor according to the invention therefore combines, on a same substrate, traditional components with deterministic behavior, such as logic gates, addressable memories and switches, able to be produced using the typical field effect transistor technology (FET, MOSFET), and nanocomponents having a random behavior for generating random signals, these signals being able to be combined and manipulated by the traditional logic circuits.

Different physical processors can be used to produce stochastic clocks and components with a nanometric size: tunnel effect, photon capture or transmission, or simply exploitation of the unstable behavior of underpowered or nanometric transistors.

Such a stochastic parallel microprocessor makes it possible to depict and manipulate probability distributions at the most basic level: that of electrical signals and nanocomponents. The stochastic electrical signals in fact constitute a natural substrate for probabilistic information.

The present description is provided as an example and is not limiting with respect to the invention.

In particular, the simple logic circuits shown in FIGS. 2 to 6 are merely examples of logic circuits that can be implemented in the programmable logic units 2 of the elementary modules 1 of a microprocessor according to the invention.

The invention claimed is:

1. A microprocessor comprising at least one elementary stochastic computation module configured to receive, as input, two random and independent binary input signals each representing a binary coding of two respective given input probability values, and to generate, as output, at least one random binary output signal from the two input signals, said at least one elementary stochastic computation module comprising:

at least one programmable logic unit, configured to combine the two input signals generate the output signal according to at least one determined logic function, such that the output signal represents a binary coding of an output probability value as a function of the given input probability values;

at least one addressable memory, configured to store said output probability value coded by the output signal generated by the at least one programmable logic unit;

at least one first stochastic clock, configured to produce a first random impulse clock signal to control a writing speed, in the at least one addressable memory, of the output probability value coded by the output signal generated by the at least one programmable logic unit; and at least one second stochastic clock, configured to produce a second random impulse clock signal to control a reading speed of the at least one addressable memory, so as to provide a current evaluation, over a given time window, of the output probability value stored in the at least one addressable memory.

2. The microprocessor according to claim 1, wherein the at least one elementary stochastic computation module is further configured to receive, as input, the two random and independent binary input signals, each of the two random and independent binary input signals comprising a stochastic impulse binary coding or a telegraphic temporal binary coding, respectively, of the two given input probability values, and to generate, as output, the random binary output signal, of the telegraphic or impulse type, and wherein the at least one programmable logic unit is further configured to combine the two input signals to generate the output signal according to the determined logic function, such that the output signal represents a stochastic impulse binary coding or a telegraphic temporal binary coding of the output probability value as a function of the given input probability values.

3. The microprocessor according to claim 1, wherein the at least one programmable logic unit is configured to combine the two input signals to generate the output signal according to one or a plurality of product, sum or division functions, such that the output probability value coded by the output signal respectively corresponds to the product, the sum or the division, of the input probability values respectively coded by the two input signals.

4. The microprocessor according claim 1, the microprocessor comprising a plurality of elementary stochastic computation modules according to claim 1, the microprocessor further configured to generate, in parallel, at least two output signals via at least two elementary stochastic computation modules determined from among said elementary stochastic computation modules, to implement, in parallel, at least two corresponding stochastic computations.

5. The microprocessor according to claim 4, wherein the at least two elementary stochastic computation modules are interconnected and configured to exchange signals between the at least two elementary stochastic computation modules.

6. The microprocessor according to claim 5, wherein the at least one addressable memory of at least one of the two interconnected elementary stochastic computation modules is configured to store interconnection instructions relative to the interconnection and exchange of the input and output signals between the two interconnected elementary stochastic computation modules.

7. The microprocessor according to claim 4, the microprocessor comprising at least two remote elementary stochastic computation modules and one or a plurality of addressable switch boxes configured to exchange input and output signals between the two remote elementary stochastic computation modules.

8. The microprocessor according to claim 1, the microprocessor comprising one or a plurality of random signal generators each configured to generate a random binary signal generating a binary coding of a probability value associated with a binary number, and the at least one elementary stochastic computation module is further configured to receive, as input, two random and independent binary input signals generated by the one or plurality of random signal generators.

9. A computer system comprising at least one central memory configured to store instructions and at least one central processing unit configured to execute instructions stored in the at least one central memory, the central processing unit comprising at least one microprocessor according to claim 1.

* * * * *